United States Patent [19]

Miller et al.

[11] Patent Number: 5,495,963
[45] Date of Patent: Mar. 5, 1996

[54] VALVE FOR CONTROLLING PRESSURE AND FLOW

[75] Inventors: Scott R. Miller, Roswell; Roger A. Ziecker, Lawrenceville, both of Ga.

[73] Assignee: Nordson Corporation, Westlake, Ohio

[21] Appl. No.: 185,699

[22] Filed: Jan. 24, 1994

[51] Int. Cl.[6] ........................................ B67D 5/34
[52] U.S. Cl. .............................. 222/318; 138/43; 222/504; 251/126
[58] Field of Search ................. 222/146.5, 318, 222/504, 559; 138/43; 251/126, 216

[56] References Cited

U.S. PATENT DOCUMENTS

| | | | |
|---|---|---|---|
| 1,918,959 | 7/1933 | Culp | 138/43 |
| 2,327,025 | 8/1943 | Davis | 251/126 X |
| 2,402,729 | 6/1946 | Buchanan | 138/43 |
| 2,833,311 | 5/1958 | Baldelli | 138/43 |
| 3,907,249 | 9/1975 | Persson | 251/126 |
| 4,200,207 | 4/1980 | Akers et al. | 222/318 X |
| 4,724,899 | 2/1988 | Frates et al. | |
| 4,734,188 | 3/1988 | Burdette, Jr. et al. | |
| 4,850,514 | 7/1989 | Scholl et al. | 222/146.5 |

*Primary Examiner*—Kevin P. Shaver
*Attorney, Agent, or Firm*—Wood, Herron & Evans

[57] ABSTRACT

A variable restrictor valve for use in an intermittent dispensing system having a recirculation loop. The restrictor valve establishes a more linear relationship between the amount of adjustment made thereto and the resulting pressure drop over the restrictor valve in the recirculation loop. A first embodiment of the restrictor valve changes the length of the flow path created by a helical groove to thereby adjust the flow resistance through the valve. A second embodiment uses a valve member in the form of a perforated cylindrical tube which is adjustable to present a varying number of perforations as the inlet to the tube and thereby allow adjustment of the flow resistance. A third embodiment utilizes a helical spring as a valve member in which adjustable spacing between the coils of the spring provides adjustability of the flow rate through the spring.

1 Claim, 1 Drawing Sheet

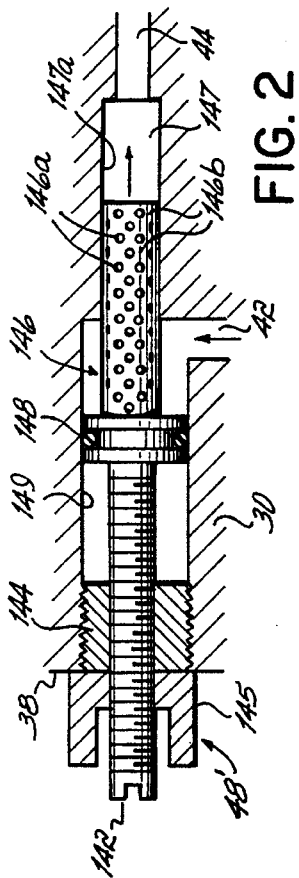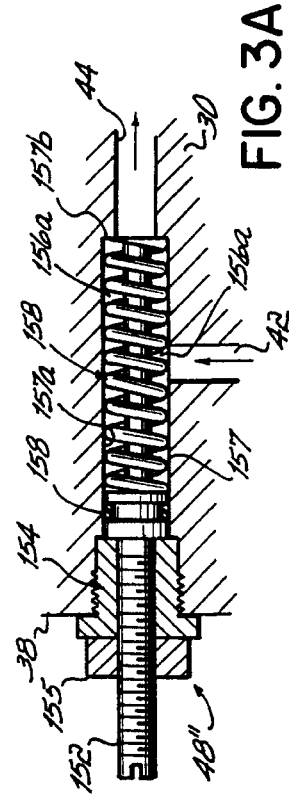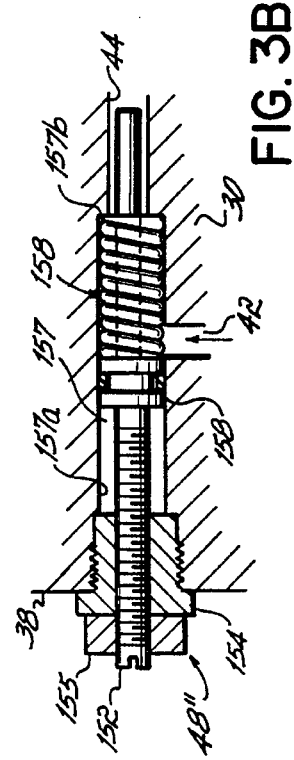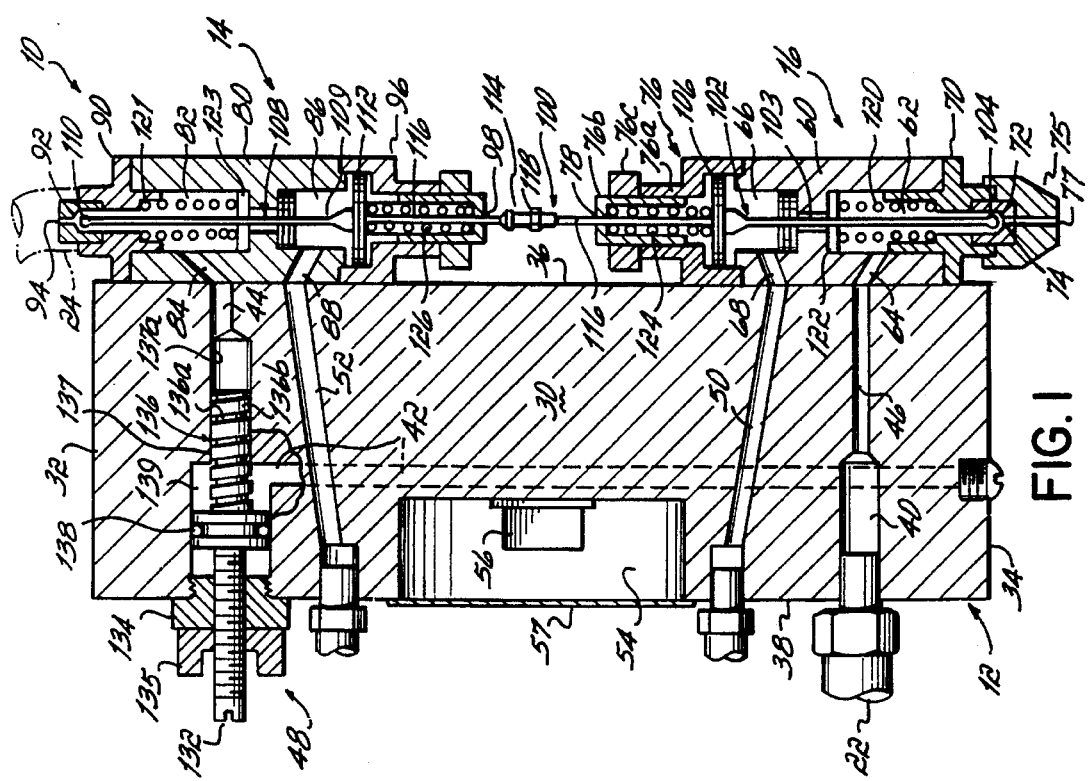

VALVE FOR CONTROLLING PRESSURE AND FLOW

BACKGROUND OF THE INVENTION

The present invention generally relates to fluid dispensing systems and, more particularly, relates to a valve for controlling the pressure and flow in a recirculation loop of an intermittent fluid dispensing system.

The use of variable restrictors in intermittent fluid dispensing systems is generally known for the purpose of controlling the flow of fluid in a recirculation loop of the system when the dispenser is shut off between dispensing cycles. One such variable restrictor is disclosed, for example, in U.S. Pat. Nos. 4,200,207 and 4,850,514 both being assigned to the assignee of the present invention. The variable restrictor disclosed in each of these patents generally controls either the flow rate or the pressure of polymeric material in the recirculation loop by adjusting the size of an aperture within the variable restrictor. For example, with a positive metering pump which maintains a constant flow rate, the variable restrictor will affect the pressure drop across the recirculation loop. However, in a system which maintains a constant pressure the variable restrictor will affect the flow rate of fluid in the recirculation loop.

While the above-mentioned variable restrictor does allow adjustment of the flow rate or the pressure in the recirculation loop within a predetermined range, the adjustment provided by the variable restrictor tends to be quite "nonlinear" and "sensitive" in nature. The nonlinear, sensitive relationship between adjustment of the restrictor and change in flow rate or pressure causes precise control of flow rate and pressure to be rather difficult. This is because, for example, the first turn of the valve stem of the restrictor will not produce the same change in flow rate or pressure as the next turn of the valve stem. Sensitivity of such past variable restrictors is high in that, for example, a slight adjustment might have a relatively large effect on flow rate or pressure. Thus, depending on the specific flow rate and viscosity of polymeric material in the system containing the variable restrictor, as mentioned above, adjustment of the restrictor will generally be nonlinear and the pressure in the system will also sometimes rise and/or fall erratically. Flow and pressure adjustments made with past variable restrictors often involves a time consuming trial-and-error procedure due to high sensitivity of the adjustments. As a result, there is a need in the art for a variable restrictor which is easily adjustable in a more linear manner and which has less adjustment sensitivity and therefore a wider effective adjustment range than variable restrictors of the past.

Another problem associated with prior variable restrictors such as the one mentioned above is that the use of a variable size aperture within the restrictor presents difficulties when the aperture size is severely reduced or, in other words, during extremely low flow rate and high pressure conditions. When the aperture is severely reduced in size, it can easily become plugged or blocked by char or other impurities or debris within the liquid flowing through the recirculation loop of the system. Thus, it would be advantageous to provide a variable restrictor which does not rely on a variable size aperture to adjust pressure and flow.

It has therefore been one object of the present invention to prevent impurities from impeding flow through a variable restrictor.

It has been another object of the invention to establish a more linear relationship between adjustment of the variable restrictor and the corresponding change in pressure within a fluid system and, more specifically, within the recirculation loop of a dispensing system fluid.

SUMMARY OF THE INVENTION

To these ends, the preferred embodiments of the present invention comprise variable restrictors for adjusting the flow rate or pressure in a fluid system in a quick, accurate and more linear manner. The first two embodiments do not rely on variable size orifices to achieve flow and pressure adjustment. Instead, in a first embodiment of the invention a variable length restricted fluid flow path is provided in the restrictor valve and in a second embodiment a variable number of fixed size orifices are provided to adjust the flow resistance provided in the variable restrictor. The third embodiment utilizes a compressible helical spring to change the size of the fluid inlet to the restrictor by changing the size of the spacing between the coils of the spring.

The first embodiment of the present invention more specifically comprises a variable restrictor valve having an adjustable valve stem and a valve member comprising a helical groove in an outer surface of the stem and extending to one end thereof. The groove provides a fixed width or diameter restricted flow path for the fluid flowing through the restrictor. The valve stem is axially adjustable with respect to two chambers in the variable restrictor to vary the length of the flow path through the restrictor. The first chamber is cylindrically shaped and sized to receive the grooved portion of the valve stem with a close tolerance fit which allows rotational and sliding movement of the grooved portion therein. Axial movement of the grooved portion of the valve stem changes the length of the fluid path established between the wall of the first chamber and the helical groove to thereby allow precise, substantially linear control of the pressure drop across the restrictor. The smooth or ungrooved areas of the grooved portion engage the wall of the first chamber in a sealing manner due to the close tolerance fit therein. The first chamber communicates with a fluid outlet while a second, larger diameter cylindrical chamber receives an upstream end of the helically grooved stem portion and communicates with a fluid inlet to the restrictor.

The first embodiment further includes an internally threaded sleeve which receives a mating externally threaded portion of the valve stem. The valve stem is thereby axially adjustable with respect to the sleeve. A seal assembly is attached to the valve stem and located between the sleeve and the inlet to the second chamber. The seal assembly rotates and moves axially with the stem while providing a fluid seal against the wall of the second chamber. The fluid inlet communicates with the second chamber at a location between the seal assembly and the first chamber. The first and second chambers are preferably formed by cylindrical bores contained within a fluid dispensing device.

The second embodiment of the invention comprises a variable restrictor valve which includes a valve stem adjustably received by a sleeve as in the first embodiment and further including a valve member at one end. The valve member and stem are received in first and second cylindrical chambers, respectively, as in the first embodiment. The valve member further comprises an elongated perforated tubular member extending within both the first and second chambers. Like the grooved valve; member of the first embodiment, the tubular valve member of the second embodiment slides within the first chamber such that an outer surface of the tubular valve member substantially sealingly engages the inner wall of the first chamber to substantially prevent any fluid flow between the outer surface of the tubular valve member and the inner wall of the first chamber. As in the first embodiment, the first chamber communicates with a fluid outlet and the second chamber communicates with a fluid inlet. Perforations or apertures extending along the length of the tubular valve member allow fluid to flow from the fluid inlet located in the second chamber into the hollow interior of the tubular valve. From the tubular valve, the fluid flows through the first chamber to the fluid outlet of the second chamber. Axial adjustment of the stem adjusts the number of apertures which are in fluid communication with the second chamber to thereby adjust the flow rate through the restrictor or the pressure drop across the restrictor.

It will be appreciated that in both of the above embodiments, the flow path within the variable restrictor does not rely on an adjustable size aperture in the flow path. Rather, in the first embodiment, an adjustable length flow path is created to allow adjustment of the pressure drop across the restrictor while in the second embodiment a flow path is created through the use of a plurality of apertures which are fixed in size but adjustable in the number available for communication with the fluid inlet of the restrictor.

The third embodiment of the invention includes only one cylindrical chamber unlike the first two embodiments which each preferably use two chambers of different size. The third embodiment comprises a variable restrictor valve having an axially adjustable valve stem which is coupled to a valve member formed by a helical spring extending within the cylindrical chamber of the restrictor. As in the first and second embodiments, the valve stem is externally threaded and is received by and axially adjustable in an internally threaded sleeve disposed adjacent one end of the chamber. The spring is received with a close tolerance fit in the chamber but this fit must also allow for any diametric expansion of the spring during compression thereof within the chamber. The stem further includes a seal assembly having a bearing plate which bears against one end of the spring to thereby allow adjustable compression of the spring.

In the third embodiment the flow loath created between the inlet and outlet of the variable restrictor includes the interior of the helical spring. Fluid flowing into the restrictor through the fluid inlet can only travel through the restrictor by first passing between the coils of the helical spring and then traveling through the interior of the helical spring to the fluid outlet. Adjustment of the stem in one direction compresses the helical spring and causes the flow rate through the spring, and therefore through the restrictor, to be reduced thereby increasing the pressure drop across the restrictor. Adjustment of the valve stem in the opposite direction to decompress or expand the helical spring opens up the spaces between the coils and causes increased flow rate through the restrictor and a decreased pressure drop across the restrictor.

These and other objects and advantages of the present invention will become more readily apparent to those of ordinary skill in the art upon reviewing the following detailed description of the invention along with the accompanying drawings.

BRIEF DESCRIPTION OF THE DRAWINGS

FIG. 1 is a partial cross-sectional view showing the service block and gun modules of a fluid dispenser incorporating a restrictor valve constructed in accordance with a first embodiment of the present invention;

FIG. 2 is a partial cross-sectional view of a portion of the fluid dispenser of FIG. 1 but showing a restrictor valve constructed according to a second embodiment of the invention;

FIG. 3A is a partial cross-sectional view of a portion of the fluid dispenser of FIG. 1 but showing, in an open position, a restrictor valve constructed according to a third embodiment of the invention; and, FIG. 3B is a partial cross-sectional view showing the restrictor valve of FIG. 3A in a closed position.

GENERAL ORGANIZATION

Referring first to FIG. 1, one type of fluid dispenser which may be utilized with the present invention comprises a fluid dispenser 10 which includes a service block or manifold 12, a recycle gun module 14 and a dispensing gun module 16. A pressurized hot melt adhesive source (not shown) is connected to service block 12 by a heated hose 22. The hot melt adhesive may be supplied to the service block 12 by, for example, a gear pump (not shown) which pumps a constant flow/volumetric output of hot melt adhesive. This type of dispensing system is shown, for example, in U.S. Pat. No. 4,850,514, assigned to the assignee of the present invention and hereby fully incorporated by reference herein.

The service block 12 further includes a body 30 having a top surface 32, bottom surface 34, front surface 36 and rear surface 38. An adhesive inlet port 40 is contained in the rear surface 38. Body 30 also includes a longitudinal passage 42 communicating with top and bottom transverse passages 44 and 46, respectively. A flow control valve or variable restrictor 48 is positioned within the top transverse passageway 44 and is constructed in accordance with one of several embodiments more specifically detailed below. Body 30 further includes a dispensing valve air passage 50 and a return valve air passage 52.

A temperature control well 54 is defined within body 30 and includes a temperature control assembly 56 mounted therein. A cover plate 57 covers well 54. Although not illustrated, temperature control assembly 56 is operatively connected to a heater positioned within the service block 12 for controlling the temperature of body 30.

Dispensing gun module 16 includes a gun body 60 having an adhesive chamber 62 wherein communication therewith is provided by an adhesive port 64. Gun body 60 also includes an air chamber 66 wherein communication therewith is provided by an air port 68. A lower cap 70 is mounted to the bottom of gun body 60 and defines, in part, adhesive chamber 62. Lower cap 70 includes a seat 72 having an orifice 74. A nozzle 75 having a nozzle orifice 77 is threadedly connected to lower cap 70. An air cap assembly 76 is mounted to the top of gun body 60 and defines, in part, air chamber 66. Air cap assembly 76 includes an air cap body 76a, an adjustment screw 76b having an opening 78 and being threadedly connected to air cap body 76a. A jam nut 76c is threadedly connected to an adjustment screw 76b.

Return gun module 14 includes a gun body 80 having an adhesive chamber 82 wherein communication therewith is provided by an adhesive port 84. Gun body 80 also includes an air chamber 86 wherein communication therewith is provided by an air port 88. An upper cap 90 is mounted to the relative top of gun body 80 and defines, in part, adhesive chamber 82. Upper cap 90 includes a seat 92 having a return orifice 94 therein. An air cap assembly 96 is attached to the relative bottom of gun body 80 and defines, in part, air chamber 86. Air cap assembly 96 includes an opening 98.

A valve assembly generally designated 100 extends between the return gun module 14 and the dispensing gun module 16. Valve assembly 100 includes a dispensing valve element 102 having a stem 103 with a ball valve 104 at one end thereof and a piston 106 at the other end thereof. The valve assembly 100 further includes a return valve element 108 having a stem 109 with a ball valve 110 at one end thereof and a piston 112 at the other end thereof.

An adaptor assembly generally designated 114 connects the dispensing and return valve elements 102, 108. Adaptor assembly 114 includes a pair of rods 116 each having one end attached to the dispensing and return valve elements 102, 108 adjacent the respective pistons 106, 112 thereof. The other ends of the rods 116 are connected by a turnbuckle 118. Turnbuckle 118 provides an adjustment feature for valve assembly 100. The position of ball valves 104 and 110 with respect to seats 72 and 92, respectively, can be selected by adjusting turnbuckle 118.

Spring 124 is retained between piston 106 and adjustment screw 76b. Spring 126 is retained between piston 112 and the adjustment screw of air cap assembly 96.

Springs 120 and 121 are compressibly retained by lower cap 70 and upper cap 90, respectively. Seal assemblies 122 and 123 are energized by the spring force exerted by springs 120 and 121, respectively.

Dispensing gun module 16 is mounted to the front surface 36 of block 30 by bolts (not shown). Module 16 is mounted so that transverse passage 46 registers with adhesive port 64, and air passage 50 registers with air port 68. Return gun module 14 is also mounted to front surface 36 of block 30 by bolts (not shown). Module 14 is mounted so that transverse passage 44 registers with adhesive port 84, and air passage 52 registers with air port 88.

THE VARIABLE RESTRICTOR VALVE

In the embodiment shown in FIG. 1, the variable restrictor valve 48 includes an adjustment screw or valve stem 132 which is threadedly received by a sleeve 134 threaded into body 30. The adjustment screw or valve stem 132 is axially adjustable relative to sleeve 134. A lock nut 135 is provided to lock the axial position of the adjustment screw or valve stem 132. The variable restrictor valve 48 further includes a valve member 136 directly connected for rotation with valve stem 132 and which is axially adjustable within a first cylindrical chamber 137 by way of the adjustment screw or valve stem 132. A seal assembly 138 is provided between the adjustment screw 132 and the valve member 136 and is movable therewith axially and preferably rotatably within in a second, larger diameter cylindrical chamber 139. Chamber 139 communicates with an inlet passage to the variable restrictor 48 which, in the preferred embodiments, is passage 42 of dispenser body 30. Chamber 137 communicates with an outlet passage of the variable restrictor 48 which is preferably passage 44 of dispenser body 30. The seal assembly 138 is disposed for axial movement between sleeve 134 and inlet passage 42.

In the first embodiment, the valve member 136 is formed by a square, helical thread or groove 136a extending generally lengthwise along the outer surface thereof. It will be appreciated that other groove configurations including, but not limited to, helical grooves may be utilized in this first embodiment. Also, the cross-sectional shape of the groove may be different than the square shape shown in FIG. 1. It could, for example, be trapezoidal in shape. The valve member 136 and chamber 137 preferably have complementary cylindrical shapes with the valve member 136 being sized to fit within the first chamber 137 with a close tolerance sliding fit such that the smooth outer surface 136b of valve 136 slides against the inner wall 137a of chamber 137 to substantially seal against passage of liquid between outer surface 136b and wall 137a. Thus, liquid adhesive flowing from inlet 42 into chamber 139 travels in the flow path created by the helical thread or groove 136a and wall 137a into chamber 137 and through outlet passage 44.

Rotation of the adjustment screw 132 changes the length of this flow path and therefore the flow resistance between the respective inlet and outlet passages 42 and 44 by adjusting the number of turns of the helical thread or groove 136a which the liquid adhesive must pass through while traveling between the groove 136a and the inner wall 137a of chamber 137 before reaching outlet passage 44. As the flow resistance increases in this manner, the pressure drop over the valve member 136 will also increase. As mentioned above, the size and design of the helical groove 136a may be chosen and varied according to the specific application needs. It has been calculated that the relationship between the amount of adjustment of adjusting screw or valve stem 132 and the amount of the corresponding pressure drop is substantially linear. Thus, adjustment of the pressure drop over the valve member 136 is very predictable and therefore easier to make than with past variable restrictors.

Turning to FIG. 2, a variable restrictor 48' is shown and includes an adjustment screw or valve stem 142 which is threadedly received by and axially adjustable within a sleeve 144 threaded into body 30. A lock screw 145 is provided to lock the position of the adjustment screw or valve stem 142 with respect to the sleeve 144. The adjustment screw or valve stem 142 is connected to a valve member 146 comprising a hollow cylindrical tube having a plurality of perforations or apertures 146a in the outer surface thereof. The valve member 146 is slidably received with a close tolerance fit within a first cylindrical chamber 147 such that the outer surface 146b of the valve member 146 slides against the inner wall 147a of chamber 147 and substantially prevents passage of liquid therebetween. The valve member 146 and chamber 147 preferably have complementary cylindrical shapes. The valve member 146 is axially and rotatably movable within chamber 147 by the adjustment screw or valve stem 142. A seal assembly 148 is rigidly secured to the adjustment screw or valve stem 142. The seal assembly 148 is rotatably and slidably disposed within a second, larger diameter cylindrical chamber 149 in body 30 to provide a dynamic seal as in the first embodiment. Chamber 149 communicates with inlet passage 42 while chamber 147 communicates with outlet passage 44. The seal assembly 148 is disposed for axial movement between sleeve 144 and inlet passage 42.

It will be appreciated that adjustment of screw 142 will move the valve member 146 axially within passage 147 such that adhesive flowing between inlet and outlet passages 42 and 44 will first pass through the apertures 146a in valve member 146 and then through the hollow interior thereof. The flow resistance created by valve member 146 will be a function of the number of apertures 146a which are available to accept fluid flowing into chamber 149 from inlet passage 42. Thus, if adjustment screw or valve stem 142 is rotated to the right as shown in FIG. 2, the valve member 146 will move farther into chamber 147 and therefore a decreased number of apertures 146a will be available for allowing fluid to enter valve member 146 from inlet passage 42. Movement of valve stem 142 into the variable restrictor 48' thus increases the flow resistance therethrough and increases the pressure drop across the restrictor 48'. Likewise, if adjustment screw or valve stem 142 is rotated so as to move valve member 146 to the left as shown in FIG. 2, the flow resistance and pressure drop will be decreased as a greater number of apertures 146a will be available for allowing fluid to enter valve member 146 from inlet passage 42. Of course, the size, number of apertures 146a and their relative placement along the valve member may be chosen and varied according to the specific application needs and the desired adjustment profile. It has been calculated that varying the flow resistance in this way allows a more linear relationship (or any other desired profile) to be established between the amount of adjustment of screw or valve stem 142 and the resulting pressure drop over the variable restrictor 48'.

A third embodiment of the invention is shown in FIGS. 3A and 3B and comprises a variable restrictor 48" which, like the first two embodiments 48 and 48', includes an adjustment screw or valve stem 152 threadedly received by a sleeve 154. The valve stem 152 may be locked with respect to the sleeve 154 by a lock nut 155. The adjustment screw or valve stem 152 is used to adjust a valve member 156 taking the form a helical spring contained within a cylindrical chamber 157. A seal assembly 158 disposed between the adjustment screw 152 and the valve member or helical spring 156 is also contained within chamber 157 and also forms a bearing plate which bears against one end of the spring 156. The other end of the spring 156 bears against a shoulder 157b of chamber 157. The spring 156 is received tightly but slidably within chamber 157 with the spring 156 and chamber 157 having complementary cylindrical shapes.

A fluid flow path is thereby created along the length of the spring 156 through the hollow interior thereof. Adjustment of screw or valve stem 152 expands or contracts the spring 156 and changes the width of the spaces 156a between the coils of the spring 156. The spring or valve 156 may thus be adjusted between a fully opened condition, shown in FIG. 3A, and a fully closed position, shown in FIG. 3B. In the fully opened position shown in FIG. 3A, liquid such as hot melt adhesive flows from inlet passage 42 into chamber 157 through the spaces 156a between the coils in spring 156 and flows out of chamber 157 through the interior of the spring 156 into outlet passage 44. Thus, adjustment of the valve or spring 156 changes the width of the spaces 156a to vary the flow resistance into passage 157 from inlet passage 42.

OPERATION

Referring again to FIG. 1, molten hot melt adhesive under pressure as supplied to adhesive dispenser 10 through adhesive inlet port 40. Adhesive inlet port 40 is in communication with longitudinal passage 42. Adhesive flows from passage 42 into the top and bottom transverse passages 44 and 46. Adhesive flows to passage 44 by way of variable restrictor 413 of the first embodiment or, alternatively, by way of variable restrictors 48' or 48" of the second or third embodiments, respectively. Bottom and top transverse passages 46 and 44 communicate directly with adhesive ports 64 and 84 on the dispensing and return gun modules 16 and 14, respectively. Adhesive then flows through ports 64 and 84 into adhesive chamber 62 and 82, respectively. When fluid dispenser 10 is in a nondispensing condition, pressurized air is supplied to the air chamber 86 and vented from air chamber 66 so as to drive piston 112 against spring 126. In turn, ball valve 104 is driven to seat on seat 72 thereby closing dispensing orifice 74 and ball valve 110 is driven away from seat 92 thereby opening return orifice 94. By opening return orifice 94, hot melt adhesive may flow through adhesive chamber 82, out return orifice 94, and back to the hot melt adhesive supply dispenser (not shown) via the heated return hose 24. By recycling molten adhesive to the source when the dispenser 10 is in a nondispensing condition, the fluid pressure at the dispensing orifice 74 does not build a level as high as it would if the recycle feature was absent. In order that the pressure at the dispensing orifice 74 remains constant, whether the dispenser is in a dispense or nondispense condition, the flow control valve or variable restrictor 48, 48' or 48" is adjusted so that back pressure to the supply tank (not shown) is adjusted to at least approximately, if not substantially the same pressure as the dispensing pressure at the dispensing gun.

In order to place the dispenser in a dispensing condition, air is introduced into air chamber 66 of the dispensing gun module 16 and vented from air chamber 86 of the return gun module 14. The air pressure acts on piston 106 so as to drive it against the bias of spring 124. Return valve element 108 is driven against seat 92 so that molten adhesive does not flow back to the source. Dispensing valve element 102 is driven away from seat 72 so that pressurized molten adhesive contained within chamber 62 is dispensed through dispensing orifice 77 without a pressure change through the system.

Although specific embodiments of the present invention have been detailed above, the artisan of ordinary skill will readily recognize further changes and modifications thereof without departing from the scope of the inventive concepts contained herein. For example, although the first embodiment of the variable restrictor has been shown with first and second differently sized chambers, it will be appreciated that these may be substituted with one chamber as shown, for example, in the third embodiment while still achieving the same result of obtaining a variable length, restricted flow path. Also, although the variable restrictors embodying the invention have been shown and described in conjunction with a specific dispensing apparatus, it will be appreciated that the variable restrictors disclosed herein may also be used with other dispensing apparatus including other recirculation-type dispensing apparatus. The variable restrictors of the present invention may further be made as separate units with the appropriate components and chambers located therein rather than being formed as an integral part of a dispenser as shown and described in the preferred embodiments.

Other modifications and substitutions will become readily apparent to those of ordinary skill in the art and Applicant therefore intends to be bound only by the scope of the claims appended hereto.

What is claimed is:

1. A fluid dispenser for dispensing a liquid in an intermittent manner including a recirculation loop for circulating said liquid when said dispenser is off and a variable restrictor valve in said recirculation loop for adjusting the pressure therein, the fluid dispenser comprising:

a first cylindrical chamber communicating with a fluid outlet, a second cylindrical chamber having a fluid inlet communicating therewith and being larger in diameter than said first chamber, an axially adjustable elongated cylindrical valve member contained with a sliding fit within said first chamber and including a helical groove in an outer surface portion thereof, said valve member having and outer surface in abutting relationship to a wall of said first chamber to create a restricted flow path within said helical groove, said groove communicating with said first chamber and said fluid outlet at a downstream end and with said second chamber and said fluid inlet at an upstream end, a seal assembly coupled to said valve member and disposed in said second chamber for movement with said valve member and creating a dynamic seal with an inner wall of said chamber, and a sleeve and a valve stem attached to said valve member wherein said sleeve and said valve stem have respec tively mating internal and external threaded portions, and said valve stem being received by said sleeve whereby rotation of said valve stem causes axial adjustment of said valve stem with respect to said sleeve and adjustment of the amount of said helical groove contained within said first chamber and said external threaded portion on said valve stem being of smaller diameter than said seal assembly and said second chamber.

* * * * *